United States Patent [19]
Ishizuka et al.

[11] Patent Number: 5,805,666
[45] Date of Patent: Sep. 8, 1998

[54] METHOD OF AND APPARATUS FOR DIAGNOSING PERSONAL COMMUNICATION SYSTEM

[75] Inventors: Seijiro Ishizuka; Hidetoshi Inoue, both of Tokyo; Morihiko Hayashi, Kanagawa, all of Japan

[73] Assignee: Sony Corporation, Tokyo, Japan

[21] Appl. No.: 604,791

[22] Filed: Feb. 23, 1996

[30] Foreign Application Priority Data

| Feb. 28, 1995 | [JP] | Japan | 7-041058 |
| Feb. 28, 1995 | [JP] | Japan | 7-041059 |
| Feb. 28, 1995 | [JP] | Japan | 7-041062 |
| Apr. 28, 1995 | [JP] | Japan | 7-105998 |

[51] Int. Cl.$^6$ ............................................. H04M 1/24
[52] U.S. Cl. ................ 379/1; 379/37; 379/45; 455/67.1; 455/67.7; 455/421; 455/422; 455/423
[58] Field of Search .......................... 379/58, 59, 1, 379/37, 45; 455/67.1, 67.7, 33.1, 404, 421–422, 423

[56] References Cited

U.S. PATENT DOCUMENTS

| 5,016,269 | 5/1991 | Rogers. | |
| 5,134,708 | 7/1992 | Marui et al. | 455/67.7 |
| 5,203,013 | 4/1993 | Breeden et al. | 455/67.7 |
| 5,361,402 | 11/1994 | Grube et al. | 455/67.7 |
| 5,373,548 | 12/1994 | McCarthy | 379/61 |
| 5,469,494 | 11/1995 | Perez et al. | 379/1 |

FOREIGN PATENT DOCUMENTS

| 0182129 | 8/1991 | Japan | 455/67.7 |
| 4357723 | 12/1992 | Japan | 455/67.7 |

*Primary Examiner*—Curtis A. Kuntz
*Assistant Examiner*—Duc Nguyen
*Attorney, Agent, or Firm*—Jay H. Maioli

[57] ABSTRACT

When a portable terminal apparatus such as a radiotelephone malfumctions, such status can be detected, and it is diagnosed whether the portable terminal apparatus is out of order. Thus, the portable terminal apparatus can be maintained efficiently. The portable terminal apparatus includes a reception state detecting unit for analyzing a reception state of a receiving unit, and a display unit for displaying a message on the basis of an analyzed state at the reception state detecting unit, thereby when a failure of connection or maintenance of the communication network is detected, a predetermined message is displayed on the display unit. Further, the portable terminal apparatus includes a memory for storing log data concerning communication with a base station when the control circuitry detects a failure of communication.

16 Claims, 10 Drawing Sheets

METHOD OF AND APPARATUS FOR DIAGNOSING PERSONAL COMMUNICATION SYSTEM

BACKGROUND OF THE INVENTION

The present invention relates to a portable terminal apparatus such as a radiotelephone, a communication system, a communication method and a method of diagnosing the radiotelephone and system.

Various kinds of radiotelephones have been put into practice each of which sets a telephone circuit between it and a base station to communicate with the base station by wireless. When the radiotelephone carries out communication, it must initially communicate with the base station by wireless. Therefore, the radiotelephone must be located within a service area where it can communicate with the base station by wireless. The radiotelephone has a function in which it receives some control signal transmitted from the base station and displays a reception level divided into several levels. By displaying such reception level as described above, it is possible for a user to judge whether or not he stands within the service area where the communication can be carried out, to some degree.

When the user practically uses the radiotelephone, it is sometimes observed that even if the user stays within the service area, the radiotelephone fails to setting a radio telephone circuit between it and the base station because of some reasons (such as an unsatisfactory state of a radio wave, a busy state of the circuit or the like), which results in failure of calling and receiving a telephone call. It is also sometimes observed that after the communication is once commenced, it becomes impossible to maintain the radio telephone circuit, which results in interruption of the telephone call.

When the radiotelephone is used, it is comparatively frequently observed that the radiotelephone cannot be used as described above. If a specific radiotelephone is frequently brought in such state, the user (an owner of the radiotelephone) tends to doubt whether or not the radiotelephone is out of order.

In this case, the owner of the radiotelephone asks, for example, a service center of a company administrating the telephone to check or repair the radiotelephone. Since the service center does not know a development of a state of the radiotelephone, the service center check and repair the radiotelephone on the assumption that it is out of order, even if the telephone itself has no practical abnormality. As a result, such check and repair lead to a wasteful labor.

Conversely, even if the radiotelephone itself has any abnormality which sometimes prevents communication, the user judges that the communication cannot be carried out because of the unsatisfactory state of the radio wave or the like. As a result, the user may continue using the radiotelephone without having it repaired necessarily.

In either of the cases, when the radiotelephone is operated unsatisfactorily, it is impossible to know whether or not the radiotelephone is out of order until the user brings it to the service center or the like and the service center checks circuits provided inside the radiotelephone. This provides an inefficient maintenance method of the telephone.

SUMMARY OF THE INVENTION

In view of the aforesaid aspect, it is an object of the present invention to make maintenance of a communication terminal apparatus such as a radiotelephone or the like efficient.

According to a first aspect of the present invention, there is provided a communication terminal apparatus for communicating with a base station which is comprised of receiving means for receiving a signal from the base station, detecting means for detecting a condition of received signal, and alerting means for alerting a status of communication and/or status of the communication terminal apparatus.

According to a second aspect of the present invention, there is provided an alerting method for a communication terminal apparatus which communicates with a base station. The alerting method is comprised of the steps of detecting a status of communication and/or a status of the communication terminal apparatus, and altering a user to whether or not the communication terminal apparatus need be repaired.

In accordance with a third aspect of the present invention, there is provided a communication terminal apparatus for communicating with a base station which is comprised of control means for controlling a communication to the base station, detecting means for detecting an abnormal condition of the communication, and memory means for memorizing a log of the communication and/or a status of the communication terminal apparatus.

In accordance with a fourth aspect of the present invention, there is provided a system for diagnosing a condition of communication terminal which is comprised of receiving means for receiving data from the communication terminal, diagnosing means for diagnosing a condition of the communication terminal, and display means for displaying diagnosed result of the communication terminal.

In accordance with a fifth aspect of the present invention, there is provided a method of diagnosing a condition of a communication terminal. This method is comprised of the steps of detecting an abnormal condition, and memorizing a log of a condition of the communication terminal if the detecting step detects an abnormal condition.

DETAILED DESCRIPTION OF THE PREFERRED EMBODIMENTS

The present invention will be described in detail with reference to the drawings.

Figure 1:
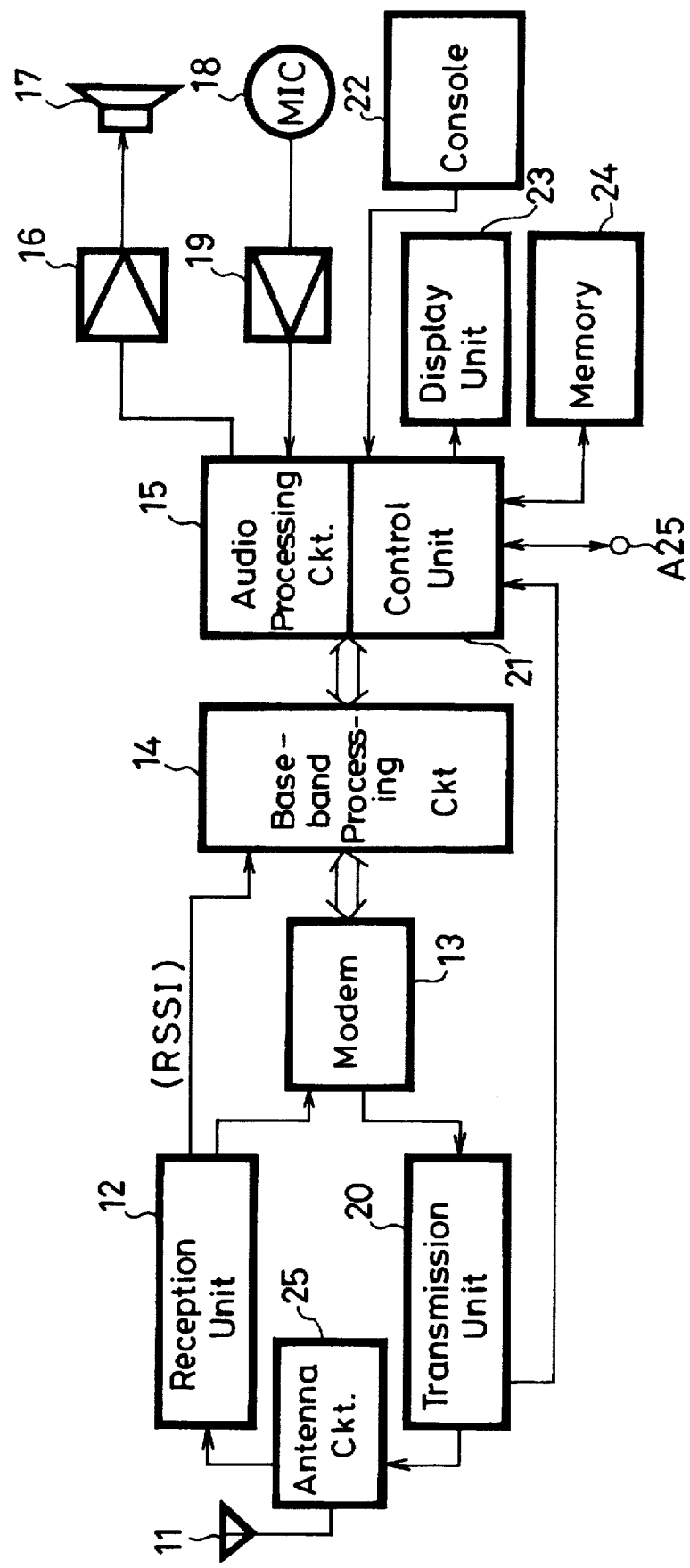
FIG. 1 is a block diagram showing a radiotelephone according to a first embodiment of the present invention.

FIG. 1 shows, in block form, a radiotelephone according to the present invention. As shown in FIG. 1, a signal received at an antenna 11 is supplied through an antenna circuit 25 to a reception unit 12, and a signal of a predetermined transmission channel is received by the reception unit 13. The processed signal from the reception unit 12 is supplied to a modulator/demodulator unit (MODEM) 13, in which it is demodulated to a baseband signal. The baseband signal thus demodulated is supplied to a baseband processing unit 14.

The baseband processing unit 14 extracts an audio signal and control data from the received signal. Then, the baseband processing unit 14 supplies the extracted audio signal to an audio processing unit 15, and also supplied the extracted control data to a control unit 21.

The audio processing unit 15 compresses or expands an audio signal in a digital audio signal processing manner such as a VSELP (vector sum excited linear predictive coding) if the radiotelephone is in the form of a digital portable communication terminal device for digital transmission. The audio processing unit 15 supplies the audio signal extracted from the received signal through an amplifier 16 to a speaker 17, from which it is emanated as sounds.

The control unit 21 comprises a microcomputer, and carries out a communication control such as setting of communication channel or switching of communication channel based on control data supplied thereto from the baseband processing unit 15.

An audio signal outputted from a microphone (MIC) 18 is supplied through an amplifier 19 to the audio processing unit 15, in which it is processed for transmission, and supplied to the baseband processing unit 14, whereafter it is processed in baseband as a transmission audio signal. This transmission audio signal is supplied to the MODEM 13, in which it is modulated for transmission. The modulated signal from the MODEM 13 is supplied to a transmission unit 20, in which it is processed to provide a transmission signal of a predetermined transmission channel. This transmission signal is transmitted through the antenna circuit 25 to the antenna 11 from which it is transmitted via radio waves.

A console 22 is connected to the control unit 21, and when keys (not shown) composing the console 22 are operated, the control unit 21 carries out various control operations for the telephone. For example, telephone number for outgoing call can be entered by operating numeral keys, and an outgoing call for entered telephone number can be made by operating transmission keys.

This radiotelephone includes a display unit 23 formed of a liquid-crystal display panel for displaying various data under control of the control unit 21. The display unit 23 displays telephone numbers for outgoing calls, duration of telephone call or character message indicating a failure, if a telephone call between it and a base station is not made normally, of a telephone call, etc. Such displayed state will be described later on. The liquid-crystal display panel of the display unit 23 is able to display a message of relatively less characters, and if a message of many characters is displayed on the display unit 23, such message is displayed on the display unit 23 by sequentially moving display characters, i.e., in a scroll fashion.

A memory 24 is connected to the control unit 21 to store therein data indicative of telephone numbers registered by the user and data indicative of abnormal state detected in accordance with the control of the control unit 21 and/or data indicative of log. Further, with respect to message data displayed on the display unit 23 on a predetermined time, necessary message data are previously stored in the memory 24. Furthermore, a diagnosing processing program for self-diagnosing whether the radiotelephone is operated normally also is stored in the memory 24. The memory 24 is of a nonvolatile memory.

In the radiotelephone according to this embodiment, data indicative of received signal field intensity (RSSI) of the signal received by the reception unit 12 is supplied through the baseband processing unit 14 to the control unit 21. Data which results from monitoring the communication state of the transmission unit 20 also is supplied to the control unit 21. This data will hereinafter be referred to as "transmission monitor data". The transmission monitor data may be data indicative of whether a power of transmission signal is at a predetermined value, for example.

The control unit 21 carries out self-diagnosis based on a diagnosing processing program stored in the memory 24 on a predetermined time, i.e., determines whether or not various processings therein are carried out normally.

The radiotelephone according to this embodiment includes a data input and output terminal A25, and data stored in the memory 24 can be read out to an external device (not shown) connected to this data input and output terminal A25 under control of the control unit 21. Data supplied to the data input and output terminal A25 from the external device can be displayed on the display unit 23 under control of the control unit 21. Further, data stored in the memory 24 is not outputted from the data input and output terminal A25 but data read out from the memory 24 under control of the control unit 21 may be modulated by the MODEM 13 and transmitted from the antenna 11 via radio waves.

The data stored in the memory 24 can be read out from the data input and output terminal A25, the input data can be displayed on the display unit 23 or the data read out from the memory 24 can be transmitted from the antenna 24 only when the operation unit 22 is operated or when the control unit 21 identifies a special service control command based on data inputted thereto from the outside.

The control unit 21 of the radio telephone according to this embodiment includes a clock function to provide data indicative of current time and current day and month (including data indicative of day, month if referred to time). Moreover, the radiotelephone according to this embodiment is driven by a power from a battery (not shown) attached thereto, and the control unit 21 is adapted to monitor a drive voltage supplied from this battery.

Figure 2:
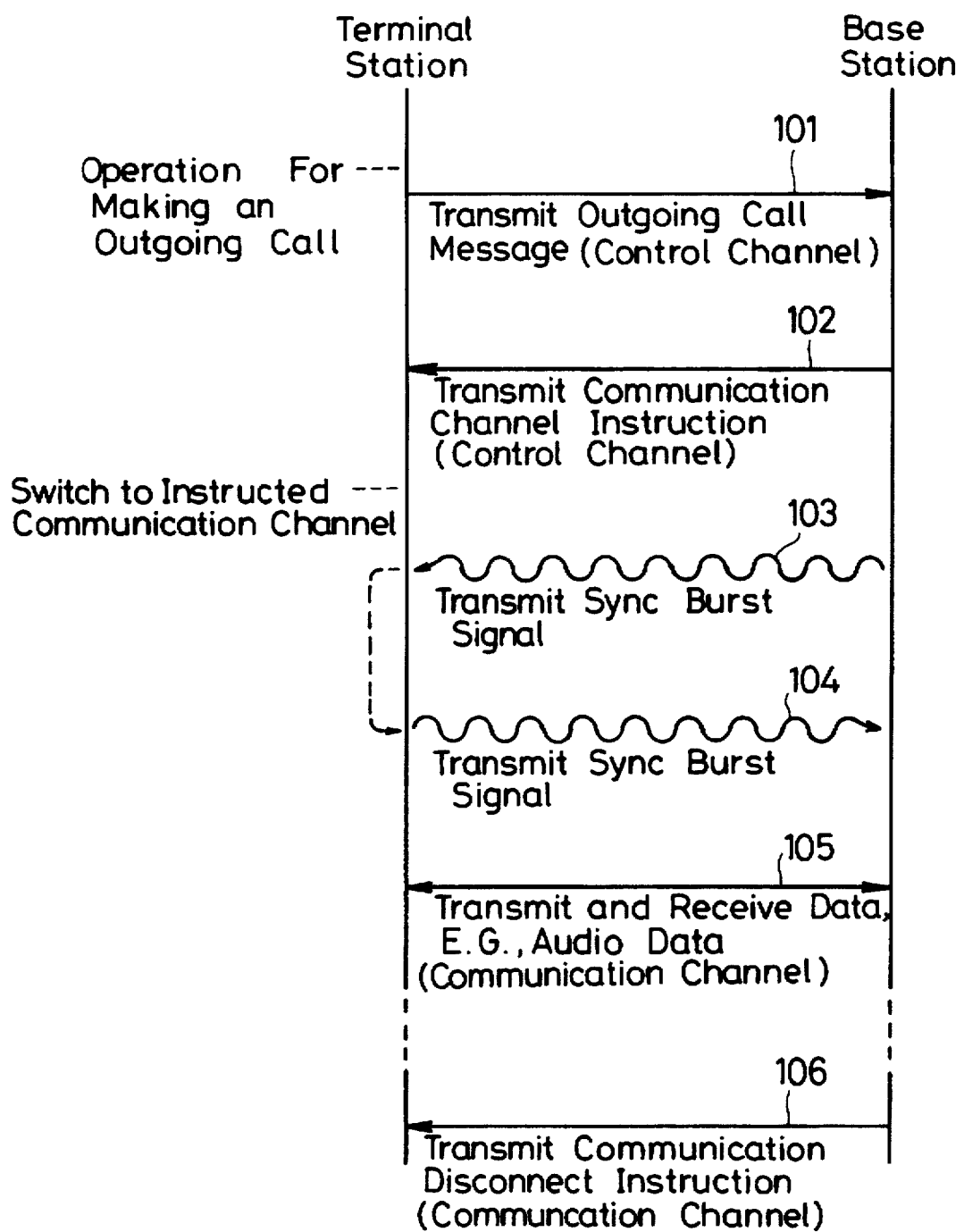
FIG. 2 is a diagram used to explain an example of a connection sequence of a digital radiotelephone.

A manner in which the user makes a telephone call by use of the radiotelephone according to the first embodiment will be described with reference to a connection sequence of FIG. 2. In this case, the radiotelephone according to this embodiment is of a digital radiotelephone for transmitting digital data.

Now, a manner in which the user makes an outgoing call from the radiotelephone according to this embodiment will be described below. A "terminal station" in FIG. 2 corresponds to the radiotelephone according to this embodiment, and FIG. 2 illustrates processing executed between the terminal station and a base station which makes a communication for the terminal station. When making an outgoing call, the user operates the console 22 to enter a telephone call of the called person (or calls the stored telephone number), and depresses a transmission key. At time the transmission key is depressed, necessary data (telephone number of its telephone, telephone number of the called person, etc.) for outgoing call message are supplied from the control unit 21 to the baseband processing unit 14. Then, this outgoing call message is modulated by the MODEM 13, processed by the transmission unit 20 for transmission, and then transmitted to the base station via radio waves (step 101), at that time, such outgoing call message is transmitted by use of a previously-determined control channel at every base station.

When the base station receives the outgoing call message, the base station searches a channel (vacant channel) from allocated communication channels, and transmits a channel instruction message for instructing a communication channel to the terminal station via the same control channel (step 102). However, the communication channel is a channel for transmitting so-called information, such as audio information, and corresponds to an audio channel from an analog system standpoint.

When the terminal station receives such channel instruction message, the control unit 21 switches the reception channel in the reception unit 12 and the transmission channel in the transmission unit 20 in such a manner that the reception unit 12 and the transmission unit 20 receive and transmit data via the instructed communication channel.

Then, the base station transmits a sync burst signal (signal with a predetermined pattern) through the instructed communication channel (step 103).

The terminal station receives this sync burst signal, and set a reception state synchronized with this received sync burst signal. Then, the terminal station transmits a sync burst signal to the base station through a communication channel of up link. The base station sets a reception state synchronized with the sync burst signal transmitted thereto from the terminal station (step 104). Thus, a synchronization between the base station and the terminal station is established, and the base station and the terminal station enter the communication channel mode (step 105).

At that time, the terminal station judges the telephone network situation and informs the base station of judged result as radio communication state report.

When the telephone communication is ended, the base station transmits a communication stop command to the terminal station via the communication channel. When the terminal station receives such communication stop instruction from the base station, the terminal station ends a communication of this communication channel (step 106). If the terminal station requests to stop communication, then the terminal station transmits a communication stop request data to the base station via the communication channel. Then, the base station transmits a communication stop instruction to the terminal station as an answer of the communication stop request data.

When the base station detects a degraded state of the communication network state based on the radiocommunication state report or the like supplied thereto from the terminal station, the base station sometimes transmits the communication stop instruction to the terminal station so as to force the communication to be ended. Further, when the terminal station carries out a hand-off processing to switch the base station to be communicated in accordance with a movement of a terminal station, the base station transmits a hand-off instruction instead of the communication stop instruction to the base station, thereby instructing a communication channel of the base station to which a new terminal station is connected.

In this manner, the terminal station and the base station have been so far communicated with each other satisfactorily. However, in actual practice, it is frequently observed that the processing in some step is interrupted depending on the communication state. A manner that the communication processing is interrupted in the radiotelephone according to this embodiment will be described below.

Initially, if the base station does not transmit the communication channel instruction to the terminal station at step 102 even when the terminal station transmits an outgoing call to the base station at step 101, then it is considered that the base station is unable to accurately receive the outgoing call message from the terminal station because the communication state between the terminal station and the base station is no good. If the base station does not transmit the communication channel instruction after a predetermined time passed after the terminal station has transmitted the outgoing call message, then the control unit 21 determines that the connection of telephone network is failed, and a corresponding message is displayed on the display unit 23 under control of the control unit 21. When such message is displayed on the display unit 23 under control of the control unit 21, a message "Radio waves are weak. So, please call one more time" is displayed on the display unit 23, thus urging the user to make a call one more time.

If the base station transmits data indicative of busy line (busy line data) to the terminal station via the control channel after the terminal station has transmitted the outgoing call message at step 101, then in such case, a communication channel used in the base station is occupied. If the terminal station receives the above busy line data and the control unit 21 judges the content of the busy line data, a corresponding message is displayed on the display unit 23 under control of the control unit 21. When such message is displayed on the display unit 23, a message "Line is busy. So, please wait for a minute" is displayed on the display unit 23, thereby informing the user that the line is busy.

If the terminal station cannot receive the sync burst signal transmitted from the base station after steps 101, 102 have been executed, then the control unit 21 similarly determines that the connection of line is failed. Then, the corresponding message "Radio waves are weak. So, please call one more time" is displayed on the display unit 23 under control of the control unit 21.

When the terminal station receives such sync burst signal from the base station and returns the sync burst signal to the base station at step 104, if the base station determines that the sync burst signal transmitted from the terminal station is not in the good condition, then a communication state transmitting and receiving the audio signal is not established, and the base station directly proceeds to step 106 whereat the base station transmits communication stop instruction. When the terminal station directly receives the communication stop instruction from the base station, the control unit 21 determines that a connection of line is failed. Then, the corresponding message "Radio waves are weak. So, please call one more time" is displayed on the display unit 23 under control of the control unit 21.

After the audio signal or the like has been transmitted and received at step 105 and the communication channel has been established, if the base station determines that the communication channel is not maintained, and transmits the communication stop instruction to the terminal station, then the control unit 21 of the terminal station determines that the communication channel cannot be maintained, and the corresponding message is displayed on the display unit 23 under control of the control unit 21. When such message is displayed on the display unit 23, the display unit 23 displays a message "Radio wave state is poor and a call is stopped" by use of message data stored in the memory 24, thereby informing the user that the line is stopped because the state of communication line becomes poor.

In addition to the above case that the communication line is stopped based on the instruction from the base station, if the terminal station determines that the communication channel cannot be maintained due to a lowered received electric field intensity, asynchronism or the like, a similar message is displayed on the display unit 23.

If the terminal station fails to set a communication channel with a new base station when the terminal station carries out the hand-off processing to switch the base station other base station after the terminal station has proceeded to the communication state, then the similar message "Radio wave state is poor and a call is stopped" is displayed on the display unit 23, thereby informing the user that the line is stopped. Alternatively, not only the message indicating that the radio wave state is poor is displayed on the display unit 23 but also a message indicating the failure of hand-off processing may be informed to the user to some extent. For example, a message "A call is stopped as the present position is move. So, please call one more time" may be displayed on the display unit 23.

Messages indicating that the communication line cannot be maintained are similarly displayed when the terminal station receives an incoming call.

When the line is not connected or maintained due to other factors (e.g., low battery, abnormality in circuit, etc.) of the terminal station other than the communication line state, a character message indicative of such failure is displayed on the display unit 23 under control of the control unit 21. When the control unit 21 detects that a voltage of battery in the telephone comprising the terminal station is too low to maintain the communication, the communication line is stopped and a message "A call is interrupted due to lowered battery. So, please exchange a battery and call again" is displayed on the display unit 23 under control of the control unit 21.

When control unit 21 detects on the basis of transmission monitor data supplied from the transmission unit 20 to the control unit 21 that an abnormality occurred in the transmission output, the control unit 21 determines that this radiotelephone comprising the terminal station does not work well. Then, a message indicating that the terminal station is out of order is displayed on the display unit 23 under control of the control unit 21. For example, a message "Please repair at service station" is displayed on the display unit 23 under control of the control unit 21.

If the control unit 21 detects an abnormality in some circuit by executing a self-diagnosing program stored in the memory 24 apart from the transmission monitor data, then the similar message "Please repair at service station" is displayed on the display unit 23 under control of the control unit 21. At that time, the content of trouble may be displayed on the display unit 23 to some extent.

According to the radiotelephone comprising the portable terminal apparatus of this embodiment, when a communication line is not connected or maintained, the character messages corresponding to the respective states are displayed on the display unit. Therefore, when the line is not connected or maintained, the user of the terminal apparatus can accurately understand that state. For example, when the state that an outgoing call cannot be made due to the poor communication state is continued, the user of the terminal apparatus can be prevented from doubting if the terminal apparatus is out of order. Accordingly, the user (owner) of this terminal apparatus can be prevented from requesting repair or inspection, and hence the user can be prevented from wasting useless time, money and labor.

Further, according to this embodiment, if the monitored transmission state or reception state is not satisfactory, then a message indicating that the terminal apparatus is out of order is displayed on the display unit. Therefore, when the terminal apparatus is out of order, the user can know such failure of terminal apparatus, and cope with such terminal apparatus. For example, when the user cannot make a call due to failure of terminal apparatus, such state can be prevented from being misunderstood that a telephone call cannot be made due to unsatisfactory radio wave state. The terminal apparatus, which has to be repaired, can be prevented from being left as it is.

In the above-mentioned embodiment, the present invention is applied to the digital system radiotelephone for transmitting and receiving digital data. However, the principle of the present invention may be similarly applied to an analog radiotelephone for transmitting and receiving an audio signal in the form of an analog signal.

A connection sequence wherein the radiotelephone shown in FIG. 1 is arranged as an analog radiotelephone for transmitting and receiving an audio signal in the form of an analog signal according to a second embodiment will be described with reference to FIG. 3.

Figure 3:
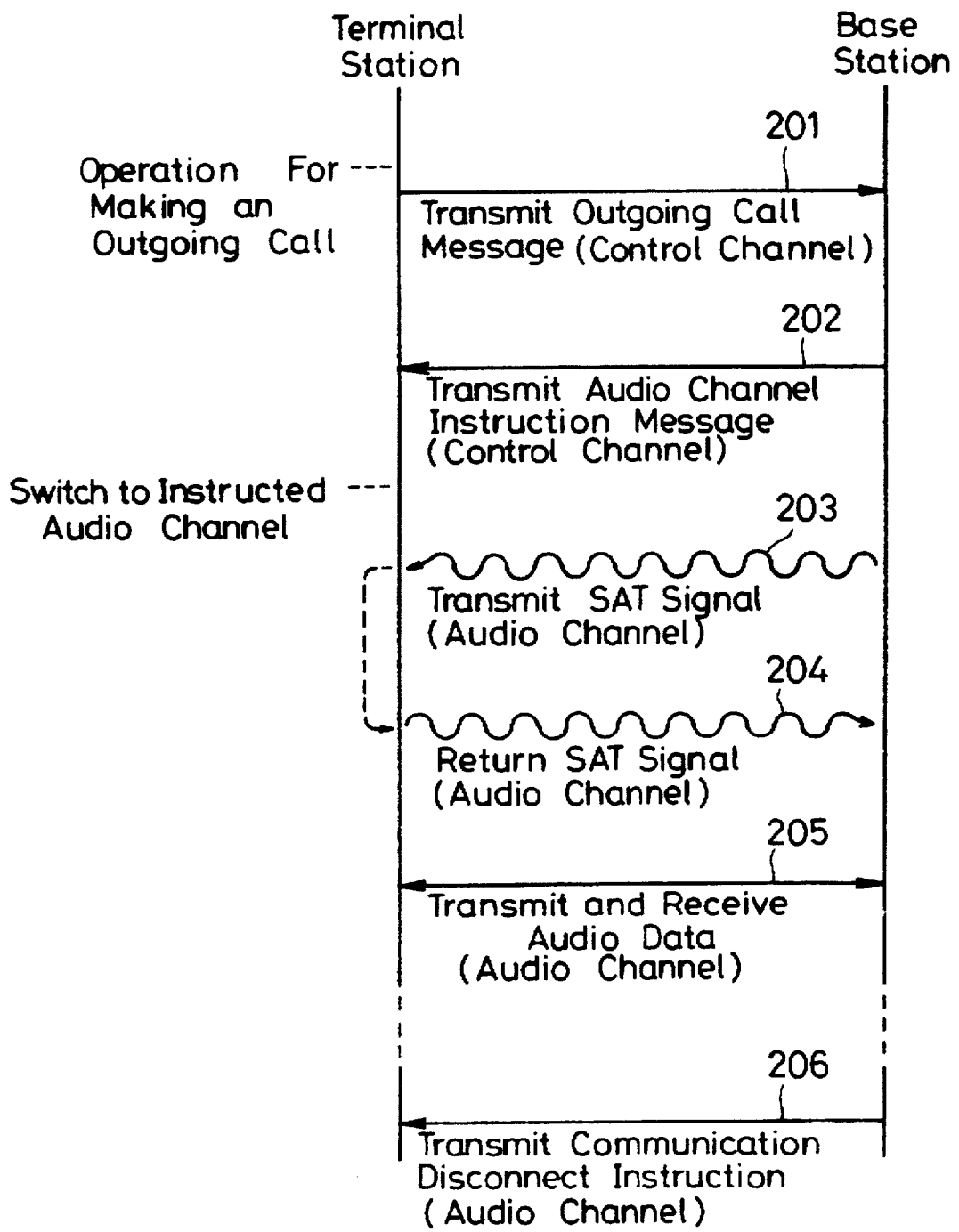
FIG. 3 is a diagram used to explain an example of a connection sequence of an analog radiotelephone according to a second embodiment.

As shown in FIG. 3, when the user makes an outgoing call, the user enters the telephone number of the called person (or telephone number stored in the memory 24) by operating the console 22, and depresses the transmission key. At a time this transmission key is depressed by the user, the terminal station transmits necessary data (its own telephone number, telephone number of the called person, etc.) from the control unit 21 to the baseband processing unit 14 as outgoing call message. After the outgoing call message is modulated by the MODEM 13, the modulated outgoing call message is processed for transmission by the transmission unit 20, and transmitted to the base station via radio waves (step 201). At that time, the outgoing call message is transmitted to the base station by use of a control channel previously-determined for every base station.

When the base station receives the outgoing call message, the base station judges a channel (unoccupied channel) from audio channels allocated to the base station, and transmits a channel instruction message for instructing an audio channel to the terminal station by use of the same control channel (step 202).

When the terminal station receives this channel instruction message and the control unit 21 judges the channel instruction message, the terminal station switches the reception channel at the receiving unit 12 and the transmission channel at the transmission unit 20 in such a manner that an audio signal is transmitted and received through the instructed audio channel.

Then, the base station transmits a signal with a frequency (e.g., 6 kHz) band different from the transmission audio signal, e.g., a super audio tone signal (hereinafter referred to as an "SAT signal") by the instructed audio signal (step 203).

When the terminal station receives the SAT signal, the terminal station returns the received SAT signal to the base station by use of audio channel of up link. Specifically, the SAT signal included in the audio channel of down link received at the receiving unit 12 disposed within the radiotelephone is returned by the MODEM 13 to the transmitting unit 20, and transmitted by the audio channel of up link.

The base station monitors the SAT signal returned from the terminal station, and judges on the basis of the state of the SAT signal the condition of the communication network. Specifically, if the returned SAT has substantially the same waveform as that of the SAT signal transmitted from the base station, then the base station determines that the condition of communication network is satisfactory. If on the other hand a distortion of waveform is large, then the base station determines that the condition of the communication channel is not satisfactory.

While the SAT signals are being continuously transmitted and received at steps 203 and 204, the audio signal is transmitted between the base station and the terminal station, and a telephone communication with the called person connected to the terminal station is the base station is made (step 205). In this case, the frequency bands of the SAT signal and the audio signal are different from each other. Therefore, if they are transmitted simultaneously, there occurs no problem.

When a telephone call at that time is terminated, the base station transmits a communication disconnect instruction to the terminal station by use of the audio channel. When the terminal station receives such communication disconnect instruction, a telephone communication of this audio channel is terminated (step 206).

When the processing is interrupted during each processing, various messages are displayed on the display unit similarly to the above-mentioned digital transmission. In the case of the digital transmission, the SAT signal is transmitted instead of the sync burst signal used in the digital transmission and the network is disconnected based on the failure of receiving the SAT signal. Therefore, if the processing executed based on the sync burst signal is replaced with the processing based on the reception condition of the SAT signal, then the audio signal can be transmitted in an analog fashion satisfactorily.

The present invention can be applied to a similar portable terminal apparatus other than the radiotelephone. That is, the present invention can be applied to a variety of apparatus so long as they are portable terminal apparatus for communicating with a base station. For example, the present invention can be applied to a data terminal apparatus for communicating with a data communication base station. In this case, the present invention can be applied to a terminal apparatus having only a reception function or a transmission function.

Displayed characters of respective conditions are not limited to those described above, and messages may be displayed by other sentences. Further, when it is difficult to display a message of a sentence by Chinese characters, a sentence of similar meaning may be displayed by the Japanese syllabary, the Japanese cursive syllabary, the alphabet or the like. Furthermore, when a sentence cannot be displayed by the above-mentioned characters but can be displayed only by numerals and symbols, such sentence may be displayed by code numbers or symbols.

Furthermore, messages of these states may be displayed by energizing a light-emitting diode (LED) independently provided. Alternatively, different states may be displayed by display colors of LEDs. In addition, these states may be displayed by sounds (acoustic means). In this case, sounds to be generated may be emanated from the speaker 17 (FIG. 1).

When a failure of connecting or maintaining a communication network is detected, a predetermined message is displayed by the display unit, and a failure of connecting or maintaining a communication network is alerted to the user. Therefore, the user can readily understand the present status of the communication terminal apparatus, and the user can be prevented from misunderstanding that the communication terminal apparatus is out of order.

In this case, when a worse state of radio wave of a signal received at the reception unit is detected, the display unit displays a predetermined message. Therefore, the user of the communication terminal apparatus can immediately understand a worse state of radio wave, and can readily make an outgoing call after the condition of radio wave is recovered.

Since the predetermined message is displayed on the display portion when the receiving unit receives data indicating that the communication line is busy, the user of the terminal apparatus can understand the reason why the communication network cannot be set, i.e., the communication line is busy. Thus, the user can wait for the next chance until the communication line is not in the busy state. For example, when the communication line cannot be connected because the communication line is busy, it is not necessary for the user to move to a place where satisfactory communication seems to be able to be carried out, on the basis of his understanding by mistake that the communication line cannot be connected because the radio wave state is unsatisfactory.

According to the present invention, when any abnormality of the transmission state or the reception state is detected, the terminal apparatus displays a predetermined message at the display portion, so that the user is informed of the abnormality of the terminal apparatus. Accordingly, when the communication line cannot be connected or maintained because of some abnormality of the terminal apparatus, the user can be prevented from judging by mistake that the communication line cannot be connected or maintained because of the unsatisfactory communication state or the like and the user is prevented from keeping the terminal apparatus without having it repaired necessarily.

A manner in which the radiotelephone is in use and the contents of log stored in the memory 24 for each operation of the radiotelephone according to a third embodiment of the present invention will hereinafter be described with reference to a flowchart of FIG. 4.

Figure 4:
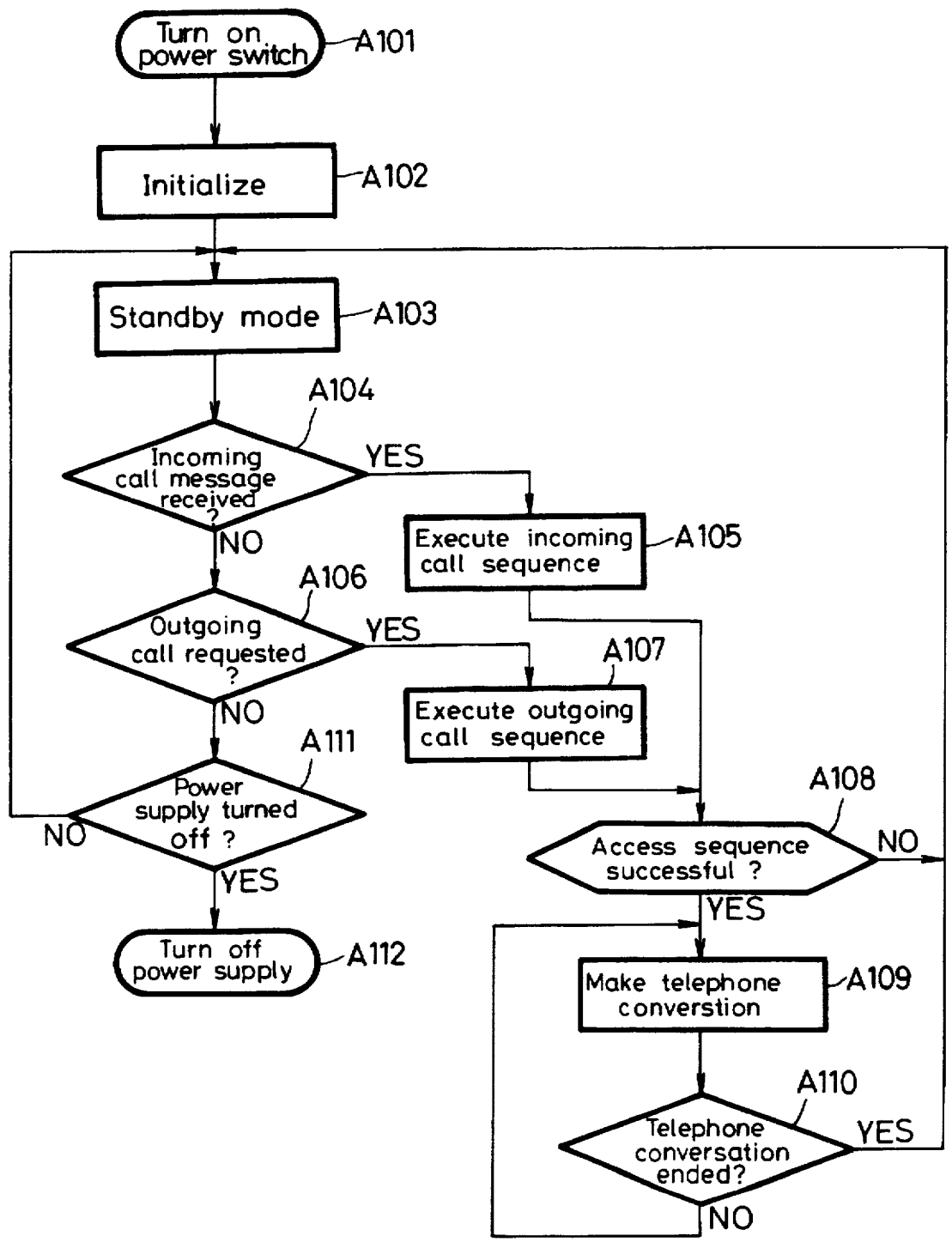
FIG. 4 is a flowchart showing an operation of the radiotelephone according to a third embodiment.

Initially, referring to FIG. 4, when the radiotelephone according to the third embodiment is in use, a power switch of the radiotelephone is turned on at step A101. Then, the processing proceeds to the next step A102, whereat initialize for registering a present position is executed by transmitting its own data through the control channel. At that time, time data indicative of time at which the power switch of the radiotelephone is turned on, data indicative of received electric field intensity of signal transmitted from the base station (specific signal such as control signal) and data indicative of transmission level from its own station are judged by the control unit 21, and memorized in the memory 24.

At the completion of initialize, the radiotelephone is placed in the standby mode at step A103. In this standby mode, the control unit 21 judges the change of battery voltage in the standby mode and the change of received electric field intensity of the signal transmitted from the base station. Data indicative of such changes are stored in the memory 24.

In this standby mode, it is determined at the next decision step A104 by intermittently receiving control signals from the base station whether or not an incoming call message is received. If the incoming call message is received as represented by a YES at decision step A104, then the processing proceeds to step A105, wherein an incoming call sequence for processing an incoming call is executed. At that time, data indicative of incoming call, data indicative of the received electric field intensity obtained at that time and data indicative of time at which an incoming call is received are stored in the memory 24 under control of the control unit 21.

If an incoming call message is not received in the standby mode as represented by a NO at decision step A104, then the processing proceeds to the next decision step A106. It is determined at decision step A106 whether or not an outgoing call is requested from the radiotelephone. If the outgoing call is requested as represented by a YES at decision step A106, then the processing proceeds to an outgoing call sequence at step A107. At that time, data indicative of the outgoing call request, data indicative of the received electric field intensity and data indicative of time at which the outgoing call is made are stored in the memory 24 under control of the control unit 21.

In the next decision step A108, it is determined whether or not the communication channel can be set and a telephone call can be made by executing the incoming call sequence or the outgoing call sequence, i.e., whether or not an access sequence is successful. When it is determined that the access sequence is successful or not, data indicative of success or failure of incoming call, data indicative of success or failure of outgoing call, data indicative of received electric field intensity and data indicative of time at which incoming call or outgoing call is successful or not are stored in the memory 24 under control of the control unit 21.

If the access sequence of incoming call or outgoing call is successful as represented by a YES at decision step A108, then the processing proceeds to step A109, wherein a telephone call is made by setting a communication line with the base station through the communication channel. At that time, data indicative of the change of received electric field intensity in communication, data indicative of used communication channel, data indicative of the change of battery voltage and data indicative of transmission level from its own terminal are judged by the control unit 21, and stored in the memory 24.

When the hand-off processing for switching the base station to be communicated is executed in the telephone call in step A109, various data judged by the control unit 21 in the hand-off processing are stored in the memory 24 under control of the control unit 21. Specifically, data indicative of success or failure of hand-off processing, data indicative of time at which the hand-off processing is carried out, data indicative of the change of received electric field intensity, data indicative of the change of transmission level from its own station and data indicative of the change of battery voltage are judged by the control unit 21 and stored in the memory 24 under control of the control unit 21.

It is determined in the next decision step A110 by the control unit 21 whether or not the telephone conversation is ended. If the telephone conversation is finished as represented by a YES at decision step A110, then data indicative of time at which the telephone conversation is ended and data indicating whether the telephone conversation is ended in the normal processing or telephone conversation is inevitably interrupted due to the worse radio wave state are stored in the memory 24.

After the telephone conversation is ended at step A110, then the processing returns to the standby mode at step A103. Also, if the access sequence is not successful as represented by a NO at decision step A108, then the processing returns to the standby mode at step A103.

When an incoming call or an outgoing call is not made, the radiotelephone is placed in the standby mode, and it is determined at decision step A111 whether or not the operation for turning off the power supply is executed. If the operation for turning off the power supply is executed as represented by a YES at decision step A111, then the power supply is turned off, and the radiotelephone is released from the standby mode at step A112. At that time, data indicative of time at which the power supply is turned off and data indicative of the battery voltage are stored in the memory 24 under control of the control unit 21.

As described above, data (hereinafter referred to as communication log data) concerning the operation state judged by the control unit 21 are sequentially stored in the memory 25. However, if it is determined by the control unit 21 that data stored in the memory 24 are communication log data which indicate the normal operation, such data are erased from the memory 24. For example, if a telephone conversation is ended normally when the access sequence becomes successful after the radiotelephone has been energized and an incoming call has been received, all data obtained until the telephone conversation is finished after the radiotelephone was energized are erased from the memory 24. Then, when a telephone conversation cannot be made, e.g., when the access sequence is not successful, all data obtained until the failure of access sequence after the radiotelephone was energized are stored and left in the memory 24. Moreover, even when the telephone conversation is made, if there is any data whose value is different from a normal value, then communication log data obtained until the telephone conversation is made are stored and left in the memory 24.

A storage capacity of the memory 24 is limited, and when a plurality of communication log data have been stored in the memory 24 and the storage capacity of the memory 24 is not sufficient for storing other data, oldest data recorded in the memory 24 is erased, and new communication log data is stored in the memory 24.

Data stored in the memory 24 at respective steps in the flowchart of FIG. 4 have been described so far by way of example. If there are other operation state data that can be judged by the control unit 21, then they may be stored in the memory 24 together with the above-mentioned data.

The storage capacity of the memory 24 should preferably be large, but a storage capacity for memorizing communication log data of 10 to several tens of telephone conversations is sufficient. If the above-mentioned data stored in the memory 24 are stored in the memory 24 in the form of codes, then even when communication log data of about several tens of telephone calls are recorded, it is possible to use a memory with a relatively small storage capacity.

The processing in which the radiotelephone according to the present invention is diagnosed on the basis of communication log data stored in the memory 24 will be described with reference to FIG. 5 and the following drawings.

Figure 5:
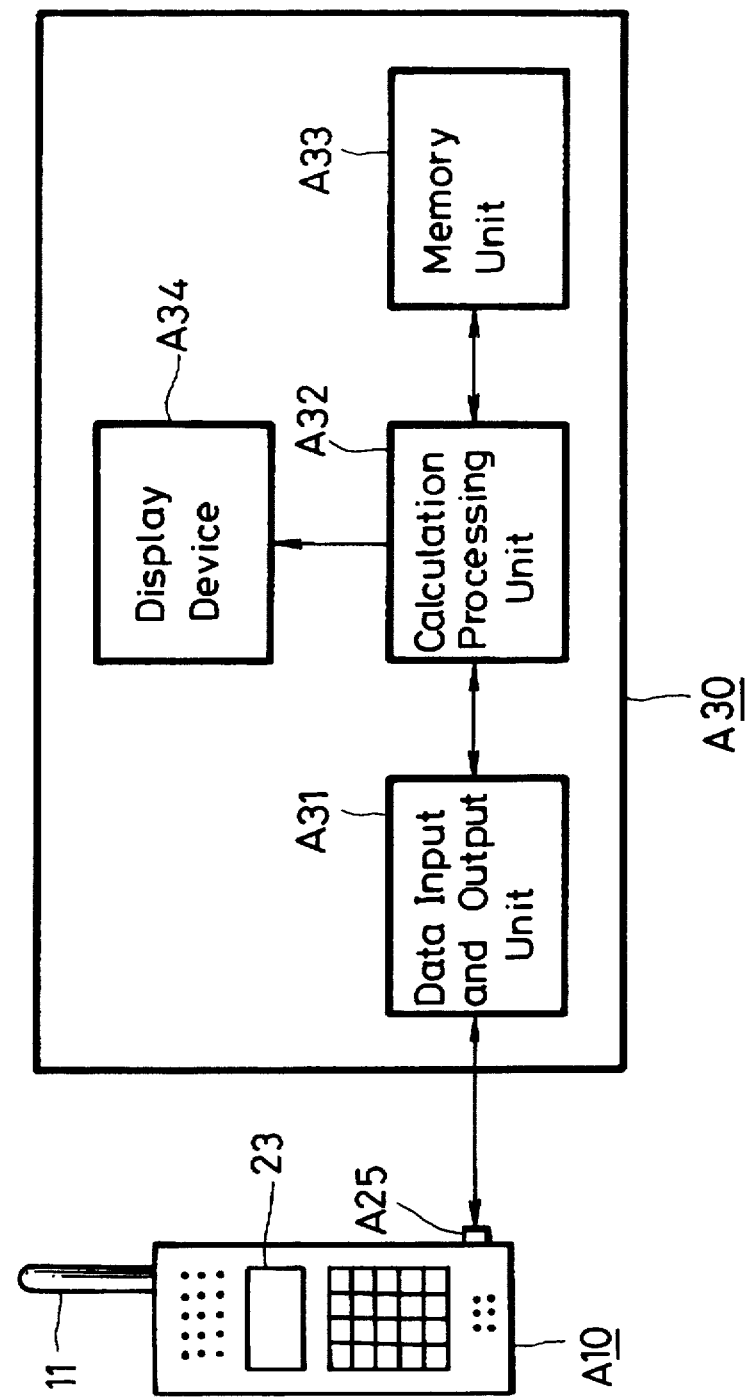
FIG. 5 is a diagram showing an arrangement for diagnosing the radiotelephone (diagnosing it by direct connection to a computer) according to the third embodiment.

FIG. 5 shows a manner in which a radiotelephone is directly diagnosed at the counter of a service center of a company for servicing telephones. A radiotelephone A10 shown in FIG. 5 is the radiotelephone with the circuit arrangement shown in FIG. 1. As shown in FIG. 5, an input and output terminal A25 of the radiotelephone A10 is directly connected by a signal line to a data input and output unit A31 of a computer A30 installed at the service center. The data input and output unit A31 of the computer A30 is connected to a calculation processing unit A32. The computer A30 diagnoses input data by the calculation processing in accordance with a diagnosing program stored in a memory unit A33, and a diagnosed result is displayed on a picture screen of a display device A34.

In the connected state shown in FIG. 5, control command for reading data stored in the memory 24 is supplied to the control unit 21 of the radiotelephone AIO by operating keys (not shown) disposed on the radiotelephone AIO or by transmission from the computer A30. Communication log data stored in the memory 24 is transferred from the input and output terminal A25 of the radiotelephone AIO to the calculation processing unit A32 through the data input and output unit A31.

Then, the calculation processing unit A32 analyzes an abnormal state by calculating the communication log data in accordance with the diagnosing program stored in the memory unit A33, and determines whether or not the abnormal operation is caused by the radiotelephone A10 itself. A judged result is displayed on the display device A34. At that time, circuits or processing which was diagnosed as a cause of abnormal operation, if analyzed, can also be displayed on the display device A34. Analyzed results of abnormal operation which is not caused by the radiotelephone A10 itself, i.e., by the network side, can also be displayed on the display device A34.

As described above, it can be determined by the computer A30 installed on the counter of the service center on the basis of abnormal communication log data stored in the memory 24 disposed within the radiotelephone AIO whether or not the radiotelephone A10 is out of order. Therefore, it is easy to determine whether the radiotelephone AIO need be repaired. Specifically, when the user of the radiotelephone carries the radiotelephone to the service center because the radiotelephone does not work well, if such radiotelephone is diagnosed by the arrangement shown in FIG. 5, then it is possible to determine whether or not the radiotelephone is actually out of order, and a telephone, which is not out of order, can be prevented from being uselessly repaired. Further, when the radiotelephone is not out of order, a technician on the service center can inform the user of the radiotelephone the cause of malfunction in detail on the basis of the diagnosed result, which can satisfy the user of the radiotelephone.

In the arrangement for diagnosing the telephone shown in FIG. 5, the diagnosed result is displayed on the display device A34 of the computer A30. However, the principle of the present invention may be applied to a modification that data indicating the diagnosed result obtained by the calculation processing unit A32 is transferred to the radiotelephone A10 from the data input and output unit A31 through the input and output terminal A25 thereby to display the data indicative of the diagnosed result on the display unit 23 of the radiotelephone A10 in the form of characters or the like.

Figure 6:
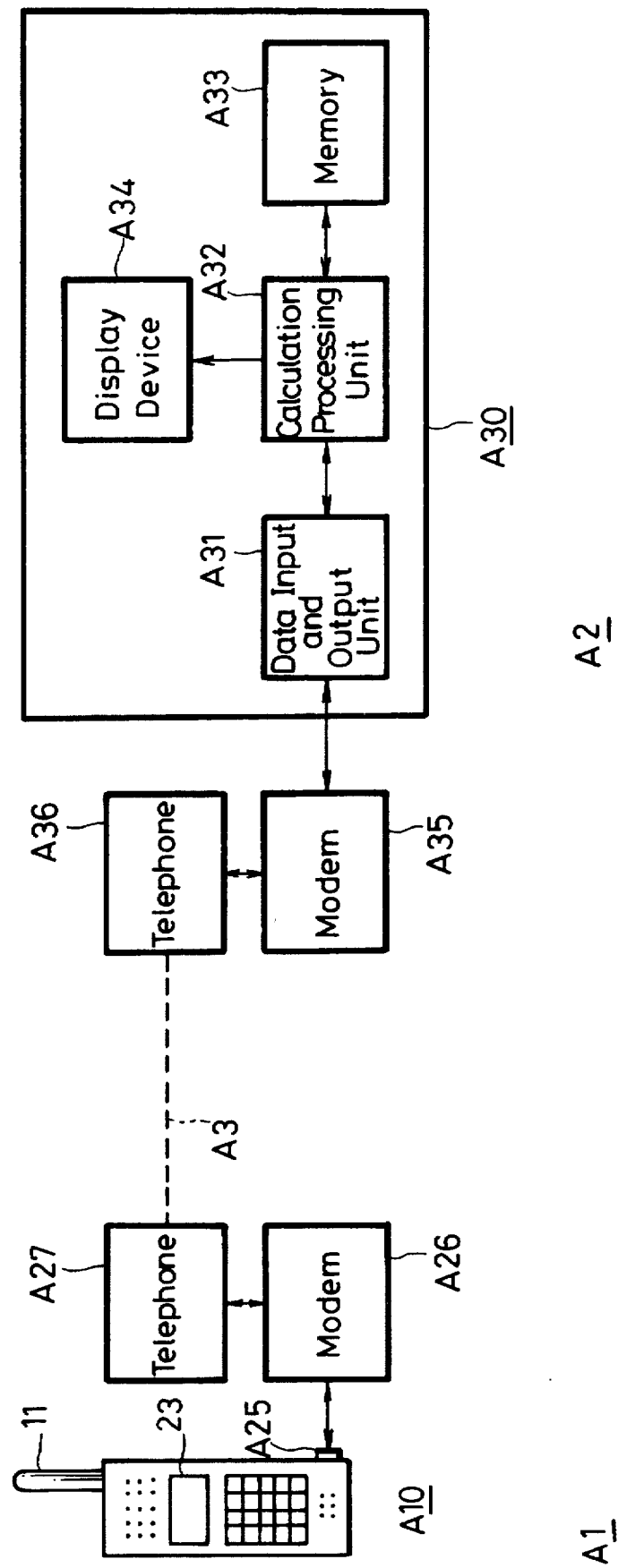
FIG. 6 is a diagram showing an arrangement for diagnosing the radiotelephone (diagnosing it by connection to the computer through a wire telephone circuit) according to the third embodiment.

A manner in which a radiotelephone is diagnosed by a computer located at the position distant from the counter of the service center will be described with reference to FIG. 6. In FIG. 6, like elements and parts corresponding to those of FIG. 5 are marked with the same references and therefore need not be described in detail.

In this example, as shown in FIG. 6, a service counter Al includes the input and output terminal A25 of the radiotelephone A10, a MODEM A26 for telephone network connected to the input and output terminal A25 of the radiotelephone A10, and a telephone A27 connected to the MODEM A26.

The computer A30 is located at a service base A2 distant from the service counter A1, and the data input and output unit A31 of the computer A30 is connected through the MODEM A35 to a telephone A36. When the radiotelephone A10 on the service counter A1 need be diagnosed, the telephone A27 of the service counter A1 and the telephone A36 on the service base A2 are connected via a telephone line A3. A rest of arrangement is similar to the diagnosing arrangement shown in FIG. 5.

As shown in FIG. 6, if communication log data transmitted from the radiotelephone A10 through the telephone line A3 is diagnosed and analyzed by the computer A30 on the service base A2 located distant from the service counter A1, then a cause of malfunction can be detected, and it is possible to determine whether or not the radiotelephone A10 is out of order similarly to the example shown in FIG. 5.

In the case of the diagnosing arrangement shown in FIG. 6, a diagnosed result may be displayed on the display device A34 on the service base A2 or data indicative of diagnosed result is fed through the telephone line A3 back to the radiotelephone A10 on the service counter A1, and the diagnosed result may be displayed on the display unit 23 of the radiotelephone A10. Alternatively, the service counter A1 may be provided with a display device (not shown) connected to the MODEM A26, and hence the diagnosed result may be displayed on the picture screen of such display device.

Since the service base A2 is provided with the computer for diagnosing radiotelephones as described above, the service counter A1 does not need the computer A30 for diagnosing radiotelephones, and the computer A30 can be made common to a plurality of service counters, thereby simplifying the diagnosing arrangement.

If the computer for diagnosing radiotelephones is installed in the service base A2 and made common to service counters as shown in FIG. 6, then communication log data of respective radiotelephones used in diagnosis can be stored and accumulated in the memory unit A33 of the computer A30. Since communication log data can be stored in the memory unit A33 as described above, a tendency that each type of radiotelephone will malfunction can be known, and such tendency can be easily used as data for developing radiotelephone of new type (e.g., radiotelephone can be modified as such one with a circuit arrangement which hardly malfunctions). Even when a diagnosing program is varied, the present invention can easily cope with such modification of diagnosing program, which will be described later on with reference to FIG. 8.

Figure 7:
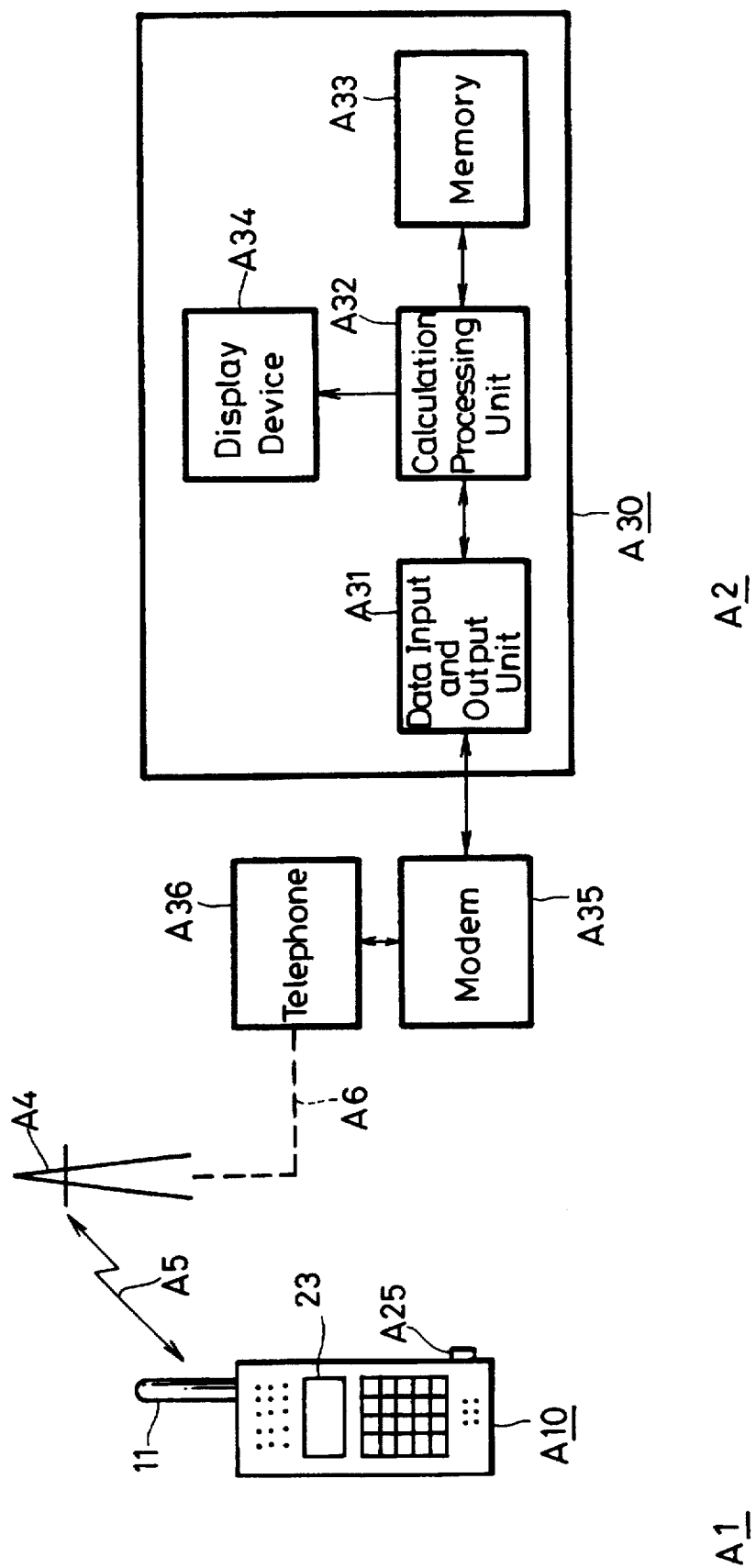
FIG. 7 is a diagram showing an arrangement for diagnosing the radiotelephone (diagnosing it by connection to the computer through a radio telephone circuit) according to the third embodiment.

In the example shown in FIG. 6, the radiotelephone A10 to be diagnosed is connected through the wire telephone line A3 to the service base A2. However, as shown in FIG. 7, the radiotelephone A10 may be connected to the service base A2 by use of communication function of the radiotelephone A10. Specifically, by the transmission processing from the radiotelephone A10 on the service counter A1, the telephone A36 on the service base A2 is accessed through the base station A4. In this case, the radiotelephone A10 and the base station A4 are connected by the wireless telephone line A5, and the base station A4 and the telephone A36 are connected by the wire telephone line (wireless telephone line also is possible).

A control command for transmitting data stored in the memory 24 is inputted to the radiotelephone A10, whereby stored communication log data is transferred through the telephone lines A5, A6 to the telephone A36 on the service base A2, and supplied to the computer A30 from the telephone A36 through the MODEM A35. Then, a cause of malfunction is analyzed by the analyzing processing based on the calculation within the computer 30. An analyzed result is returned through the telephone lines A5, A6 to the radiotelephone A10, and displayed on the display unit 23 of the radiotelephone A10. A rest of arrangement is similar to that of the embodiment shown in FIG. 6.

As shown in FIG. 7, since a communication with the service base A2 is made by using the communication function of the radiotelephone A10, a MODEM and a telephone need not be provided in the service counter A1, and hence the arrangement can be simplified more. In the case of the diagnosing arrangement shown in FIG. 7, the user need not carry the radiotelephone A10 to the service counter A1, and the radiotelephone A10 can be diagnosed so long as it is placed in the area where it can be used as the radiotelephone.

When the radiotelephone A10 is not carried to the service counter A1 and diagnosed by directly accessing the service base A2 by a telephone, the control command used to read out the communication log data from the memory 24 may be transferred and supplied to the control unit 21 from the service base A2 through a telephone line connected. With this arrangement, each user need not enter the control command.

Also in this case, a diagnosed result may be displayed by the display device A34 on the service base A2 in addition to the display unit 23 of the radiotelephone A10.

While the present invention is applied to the case that the radiotelephone for transmitting and receiving a digital signal is diagnosed, the present invention may also be applied to the radiotelephone for transmitting and receiving an analog signal. Further, the present invention is not limited to the radiotelephone and may be applied to a similar portable terminal apparatus. Specifically, the present invention can be applied to the diagnosis of various kinds of apparatus if they are portable terminal apparatus for making a communication between them and the base station. For example, the present invention can be applied to data terminal apparatus for making a communication between them and a data communication base station. In this case, the present invention can be applied to a terminal apparatus having only a reception function or a transmission function.

According to this embodiment, a cause of communication failure occurred in the terminal apparatus can be analyzed on the basis of data concerning log of communication with the base station stored in the memory means. Accordingly, the side for repairing the terminal apparatus can easily discover a portion of communication failure, and the radiotelephone can be reliably repaired. Also, a communication failure occurred due to other cause than that of the terminal apparatus itself can be detected, and hence it can be reliably determined whether the radiotelephone need be repaired. Thus, it is possible to protect the good radiotelephone from being repaired uselessly.

In this case, since data indicative of log of communication stored in the memory means is transmitted to the wire or wireless telephone line, the radiotelephone can be analyzed in the remote place, and the apparatus for analyzing radiotelephones can be made common.

Further, since the analyzed result is fed back to and displayed on the terminal apparatus, the terminal apparatus can learn the terminal apparatus, and the terminal apparatus can cope with a communication failure or the like on the basis of the analyzed result readily.

A manner in which communication log data memorized in the memory 24 is transmitted to an information control center located on the radiotelephone system will be described with reference to FIG. 8.

Figure 8:
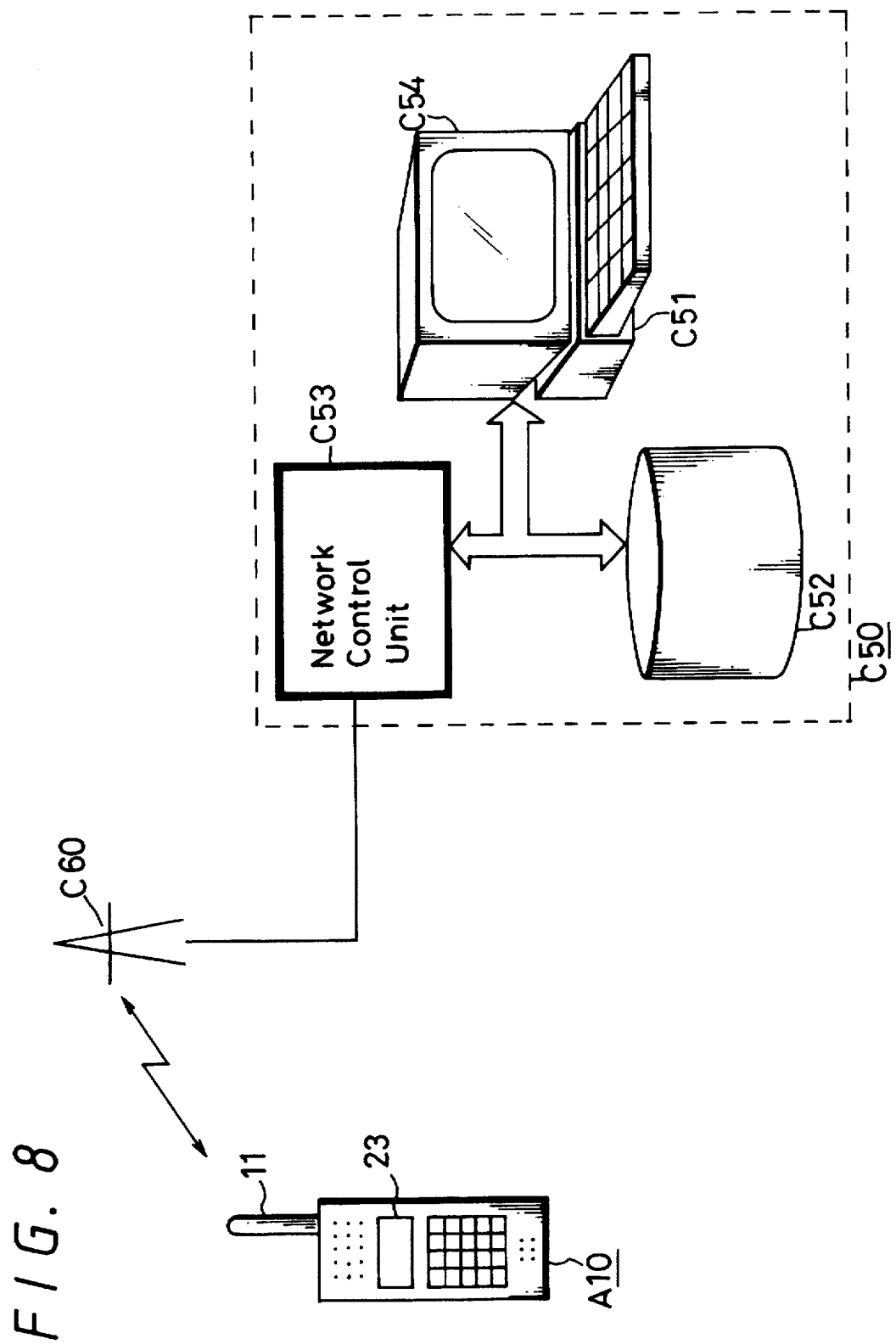
FIG. 8 is a schematic diagram showing an arrangement for reporting a trouble according to a fourth embodiment.

FIG. 8 is a schematic diagram showing an arrangement for transmitting communication log data to the information control center. A radiotelephone A10 shown in FIG. 8 is the radiotelephone with the circuit arrangement shown in FIG. 1. An information control center C50 is connected to a network with which the radiotelephone A10 communicates. When communication log data indicative of failure of communication is stored in the memory 24 of the radiotelephone A10, an outgoing call processing is made to automatically connect the communication network to the information control center C50 through a base station C60 under control of the radiotelephone A10. At the stage the information control center C60 is connected to the communication network, the communication log data indicative of failure of communication is read out from the memory 24, and the data thus read is transmitted to the information control center C50 via the communication network connected. At that time, data indicative of ID No. assigned to the radiotelephone A10 which makes an outgoing call also is transmitted to the information control center C50. The arrangement shown in FIG. 8 is similar to that of FIG. 7, and different in that, while data is transmitted and received through the telephone A36 and the MODEM A35 as shown in FIG. 7, data is directly transmitted to and received by the network control unit C53 in the form of a digital signal as shown in FIG. 8. The computer A30 shown in FIG. 7 is mainly used as computer for services, and an analyzing computer C54 shown in FIG. 8 is a computer mainly used to analyze data. However, these computers A30 and C54 may be used to do either of services and data analysis in accordance with programs, and may have exactly the same hardware. Further, these computers A30 and C54 may carry out the services and the data analysis at the same time in accordance with a program. A manner in which data is transmitted after the communication log data indicative of failure of communication was stored in the memory 24 will be described later on.

As shown in FIG. 8, the information control center C50 comprises, an analyzing computer C51, a mass-storage memory 52, and a network control unit C53, all of which are connected via bus lines. The communication log data indicative of failure of communication transmitted from the radiotelephone A10 is received at the network control unit C53, and stored in the mass-storage memory C52. At that time, the communication log data are classified at every data of the transmitted ID Nos., and stored in the mass-storage memory C52.

The analyzing computer C51 analyzes the communication log data stored in the mass-storage memory C52, and analyzed results are displayed on the picture screen of the display device C54 connected to the analyzing computer C51. A manner in which the communication log data is analyzed will be described below. When a predetermined amount of communication log data concerning a radiotelephone of a specific ID No. are stored in the mass-storage memory C52 (or data are stored with a predetermined ratio), such communication log data is analyzed, and a cause of failure of communication is analyzed. Then, it is determined whether a failure of communication occurred due to cause on the telephone itself or cause on the communication network. A judged result is displayed on the picture screen of the display device C54. Therefore, when the user visually confirms the displayed data on the display device C54, any trouble occurred in particular radiotelephone can be detected, and the occurrence of such trouble can be alerted to the user of the radiotelephone.

According to this embodiment, if it is determined that most of communication failures are caused by the telephone itself, then such radiotelephone is called via the communication network. Specifically, at the stage the network control unit C53 of the information control center C50 enables the radiotelephone A10 to automatically make an outgoing call through the base station C60 and this particular radiotelephone A10 and the communication network are connected, message data is transmitted to the radiotelephone A10. The message data at that time may be "This radiotelephone is out of order, and please repair at the service center" or the like displayed on the display unit 23. Such message data is displayed on the display unit 23 under control of the control unit 21 of the radiotelephone A10. Since the message data is displayed on the display unit 23 as described above, the owner of the radiotelephone A10 can recognize that this radiotelephone A10 is out of order, and requests the service center to repair it immediately.

The analysis in the information control center C50 is not limited to the analysis of each radiotelephone A1, and tendencies of communication failure log data with respect all radiotelephones A10 stored in the mass-storage memory C52 of the information control center C50 can be analyzed. Since tendencies of communication failure log data of the respective terminal apparatus connected to this communication system are detected by the information control center C50, situation that a trouble occurred in the network side such as the base station C60 can be analyzed, and the user can readily cope with such trouble.

The case that the communication failure log data stored in the memory 24 of each radiotelephone A10 is transmitted to the information control center 50 will be described. Initially, it is determined by the control unit 21 in accordance with a flowchart of FIG. 9 whether the communication log data stored in the memory 24 is communication failure data.

Figure 9:
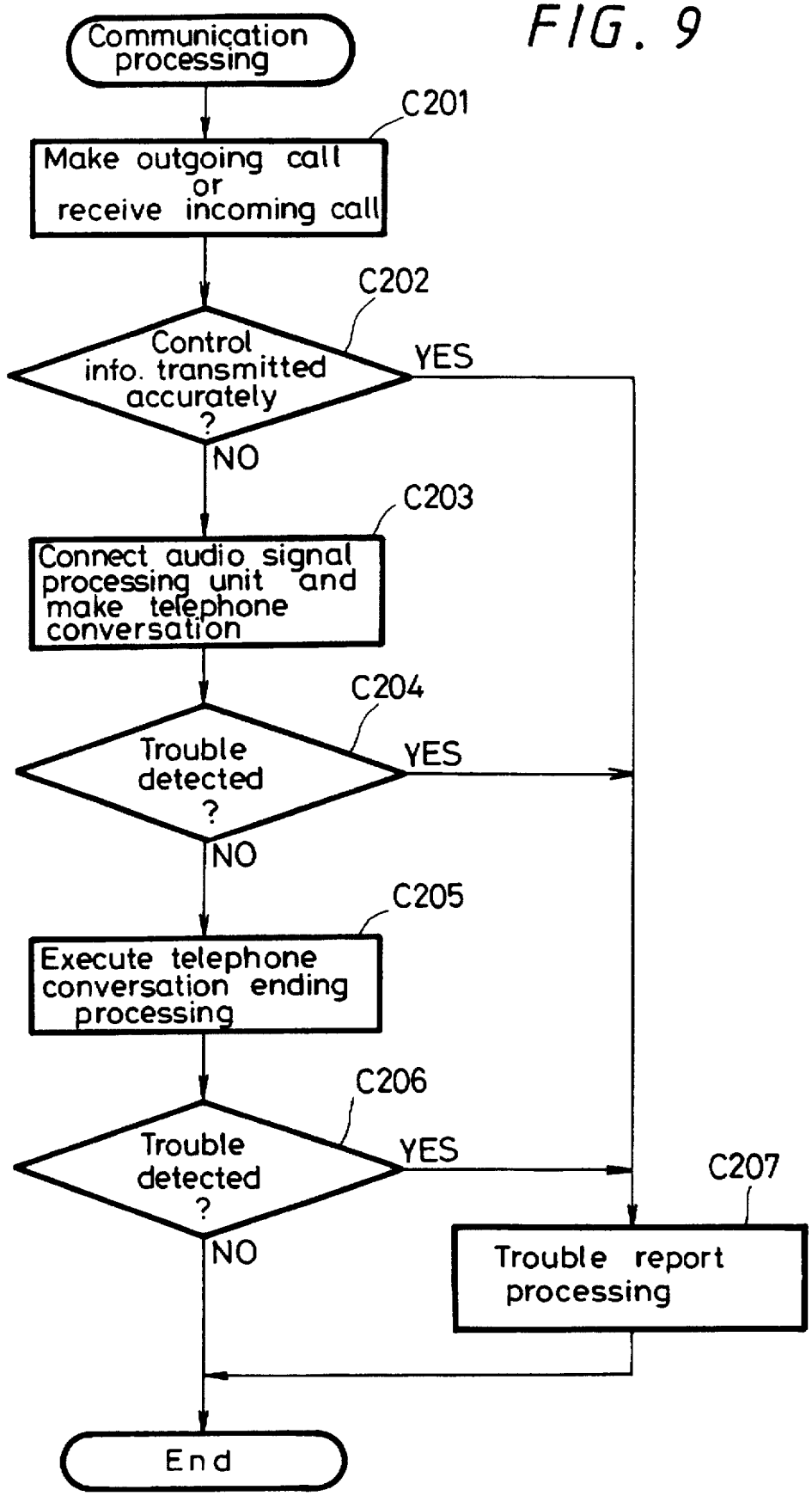
FIG. 9 is a flowchart showing a decision processing for reporting a trouble according to the fourth embodiment.

As shown in the flowchart of FIG. 9, when an outgoing call is made or an incoming call is received at step C201, the processing proceeds to the next decision step C202, whereat it is determined whether or not control information is accurately transmitted between the radiotelephone and the base station. If the control information is not transmitted accurately as represented by a NO at decision step C202, then it is determined that a trouble occurred, and the processing proceeds to a trouble report processing at step C207.

If on the other hand the control information is transmitted accurately as represented by a YES at decision step C202, then the processing proceeds to step C203, wherein an audio signal is transmitted by use of a communication channel, and a telephone conversation is executed. In the next decision step C204, it is determined whether or not a trouble occurred in the transmission of the audio signal of telephone conversation. If the trouble occurred in the telephone conversation as represented by a YES at decision step C204, then the processing proceeds to the trouble report processing at step C207.

If on the other hand the trouble in the telephone conversation is not detected as represented by a NO at decision step C204, then the processing proceeds to step C205, whereat a telephone conversation ending processing is executed at a proper time. After the telephone conversation ending processing has been executed, the processing proceeds to the next decision step C206, whereat it is determined whether or not a trouble occurred in the transmission for the telephone conversation ending processing. If a trouble occurred as represented by aa YES at decision step C206, then the processing proceeds to the trouble report processing at step C207. It is frequently observed that a trouble occurred in the telephone conversation when telephone conversation is not ended by transmitting a control signal according to the correct procedure but when a communication is forced to be disconnected.

If it is determined in step C206 that no trouble occurred in the telephone conversation ending processing, then the communication is ended, and the radiotelephone is placed in the standby mode, and the processing does not proceed to the trouble report processing at step C207.

When the processing proceeds to the trouble report processing at step C207, all communication log data stored in the memory 24 during a period until the occurrence of trouble from the standby state before a communication (outgoing call or incoming call) is started are transferred to the information control center C50.

A processing in which the thus prepared communication log data obtained when a trouble occurred are transferred (reported) to the information control center C50 will be described with reference to a flowchart of FIG. 10.

Figure 10:
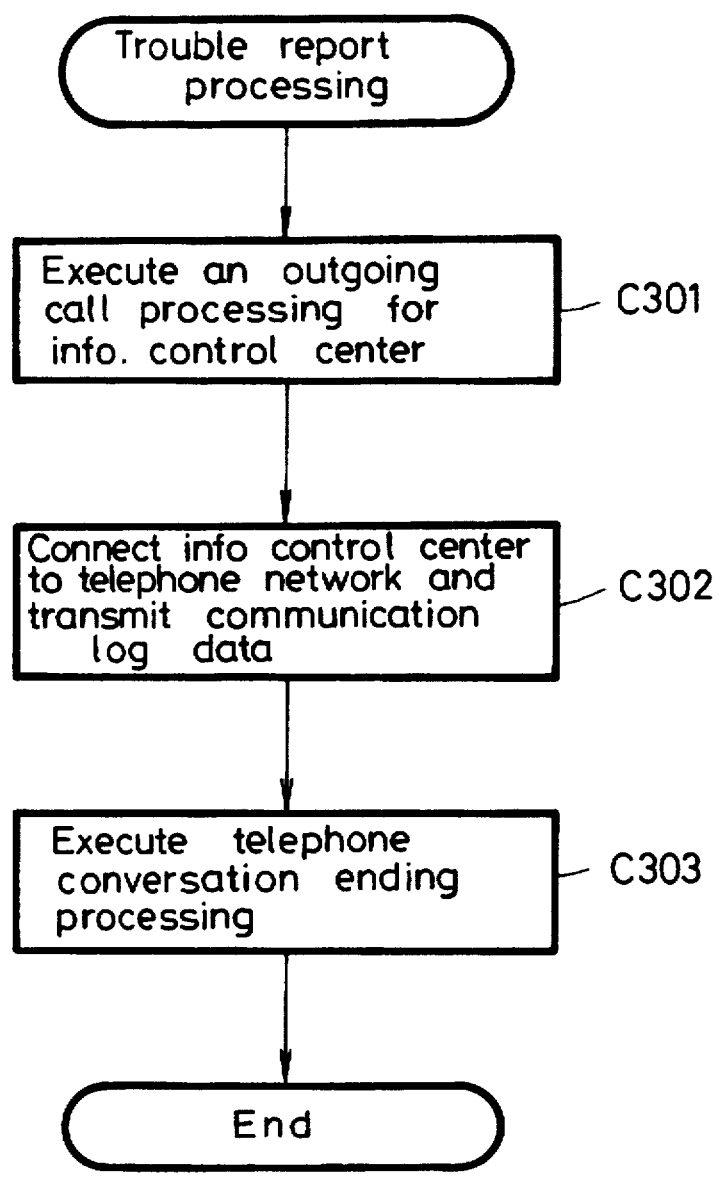
FIG. 10 is a flowchart showing a processing for reporting the trouble according to the fourth embodiment.

As shown in FIG. 10, communication log data obtained when a trouble occurred are stored in the memory 24, and at a transfer timing, which will be described later on, an outgoing call processing for the information control center C50 is executed under control of the control unit 21 at step C301. After it was confirmed by this outgoing call processing that the information control center C50 is connected to the telephone network, all communication log data obtained when the trouble occurred are transmitted to the information control center C50, and stored in the mass-storage memory C52 disposed within the information control center C50 at step C302. At the completion of the transfer processing, a telephone conversation ending processing for disconnecting the communication line is executed at step C303, and the processing is ended.

A timing at which the trouble report processing from the terminal apparatus (radiotelephone) is executed will be described below. On the assumption that the control unit 21 judges that the radiotelephone A10 is not communicated with other terminal apparatus through the network, such report processing is carried out. In the report processing from each terminal apparatus, at a time the communication log data obtained when a trouble occurred is stored in the memory 24, the report processing shown in the flowchart of FIG. 10 is executed. If the report processing is executed each time a trouble occurs, then a memory with a small storage capacity for storing communication log data can be used as the memory of the radiotelephone.

Instead of reporting a trouble one by one, the report processing from each terminal apparatus may be executed at every predetermined period. For example, once per several days (once per week), it is determined whether or not communication log data obtained when a trouble occurred is stored in the memory 24. If data to be reported is stored in the memory 24, the report processing shown in the flowchart of FIG. 10 is executed.

When communication log data is reported at every predetermined period, if the communication log data storage capacity of the memory 24 has no room before the next reporting period, at such timing point, the report processing shown in the flowchart of FIG. 10 is executed. If the report processing is executed at every predetermined period, even when a communication trouble occurs relatively frequently, it is possible to reduce the number of outgoing call for reporting communication log.

The communication log is not reported by making an outgoing call from each terminal apparatus as shown in the flowchart of FIG. 10, but communication log data obtained when a trouble occurred may be transferred from the respective terminal apparatus by sequentially accessing each terminal apparatus in the outgoing call processing from the information control center C50. If data are transferred by the outgoing call process from the information control center C50, then reports from the respective terminal apparatus can be prevented from being concentrated at the same period, and hence the work load on the information control center C50 can be relieved.

While the present invention is applied to the digital system radiotelephone for transmitting and receiving an audio signal in the form of digital code as described above, the present invention can, of course, be applied to an analog system radio telephone for transmitting and receiving an audio signal in the form of an analog signal. Further, the present invention can be applied to similar portable terminal apparatus other than the radiotelephone. Specifically, the present invention can be applied to various kinds of apparatus so long as they are portable terminal apparatus for making a telephone communication between them and the base station. For example, the present invention can be applied to a data terminal apparatus for making a telephone communication between it and a data communication base station.

When failure of communication in the terminal apparatus is detected by the information control center, status of communication is alerted to each terminal apparatus by character message. However, status of communication may be alerted to each terminal apparatus by other means such as sounds.

According to the embodiments of the present invention, since data indicative of communication log of trouble occurred in the communication terminal apparatus is transferred to and stored in the information accumulation apparatus, status of communication trouble in respective communication terminal apparatus can be controlled in a concentrated fashion on the information accumulation apparatus side. Therefore, a trouble that frequently occurs in a particular terminal apparatus can be detected, and hence such terminal apparatus can be repaired.

In this case, since log data concerning the trouble is automatically transmitted to the information accumulation apparatus when a failure of communication is detected, the failure of trouble can be reported readily to the information accumulation apparatus under simple control.

Since log data concerning failure of communication is transmitted to the information accumulation apparatus when it is detected that a communication is not carried out through the network, log data concerning trouble of communication can be transmitted without troubling ordinary communication.

Since log data concerning trouble of communication recorded in the memory unit is automatically transmitted to the information accumulation apparatus at substantially every predetermined time, the number of reporting to the information accumulation apparatus can be lessened.

Since log data concerning trouble of communication is transmitted to the information accumulation apparatus by transmitting the transmission request signal from the information accumulation apparatus through the network, it is sufficient that the report processing is controlled only by the information accumulation apparatus. Therefore, each terminal apparatus need not control the report timing and reports from respective terminal apparatus can be prevented from being concentrated at the same time, thereby relieving the work load on the information accumulation apparatus.

Further, since the information accumulation apparatus carries out the alert operation when log data concerning trouble of a particular communication terminal apparatus reaches a predetermined amount or ratio, malfunction of each terminal apparatus can be removed readily. When the terminal apparatus is out of order, for example, the terminal apparatus in its early stage of trouble can be repaired. Therefore, a fatal trouble for disabling a communication can be prevented from occurring in advance, and the radiotelephone apparatus becomes more reliable.

Furthermore, since the communication terminal apparatus is accessed to carry out the alerting operation by a communication through the network when log data concerning trouble of a particular communication terminal apparatus reaches a predetermined amount or ratio, the user of terminal apparatus can be directly alerted, and the terminal apparatus becomes more useful.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A system for diagnosing communications between a terminal and a base station, comprising:
   a communication terminal, including:
      transmitting and/or receiving means for communicating with the base station,
      control means for controlling the communication of said transmitting and/or receiving means and for determining whether the operational status of said communication terminal is normal or abnormal, and
      memory means for storing a data log relating to the operational status of said communication terminal in accordance with the determination by said control means, wherein said data log is sent when said control means determines that the operational status of said communication terminal is abnormal; and
   an analyzing unit, including:
      data input means for receiving said data log read from said memory means of said communication terminal, and
      analyzing means for diagnosing said communication terminal based on said data log from said data input means,
   wherein said communication terminal is connected to said analyzing unit via a radio telephone system for sending said data log; and wherein said communication terminal further includes display means for displaying the diagnostic results sent by said analyzing unit.

2. The system as claimed in claim 1, wherein said analyzing unit further includes display means for displaying the diagnostic results of said analyzing means.

3. The system as claimed in claim 1, wherein said data log is sent at a predetermined time interval.

4. A system for diagnosing communications between a terminal and a base station, comprising:
   a communication terminal, including:
      transmitting and/or receiving means for communicating with the base station,
      control means for controlling the communication of said transmitting and/or receiving means and for determining whether the operational status of said communication terminal is normal or abnormal, and
      memory means for storing a data log relating to the operational status of said communication terminal in accordance with the determination by said control means, wherein said data log is sent when the abnormal operation status persists for a predetermined time; and an analyzing unit, including:
data input means for receiving said data log read from said memory means of said communication terminal, and
analyzing means for diagnosing said communication terminal based on said data log from said data input means, wherein said communication terminal is connected to said analyzing unit via a radio telephone system for sending said data log; and wherein said communication terminal further includes display means for displaying the diagnostic results sent by said analyzing unit.

5. A system for diagnosing communications between a terminal and a base station, comprising:

a communication terminal, including:
transmitting and/or receiving means for communicating with the base station,
control means for controlling the communication of said transmitting and/or receiving means and for determining whether the operational status of said communication terminal is normal or abnormal, and
memory means for storing a data log relating to the operational status of said communication terminal in accordance with the determination by said control means; and an analyzing unit, including:
data input means for receiving said data log read from said memory means of said communication terminal, and
analyzing means for diagnosing said communication terminal based on said data log from said data input means, wherein said communication terminal is connected to said analyzing unit via a radio telephone system for sending said data log, and wherein said communication terminal further includes display means for displaying the diagnostic results sent by said analyzing unit.

6. A method for diagnosing a communication terminal communicating with a base station by an analyzing unit, comprising the steps of:

determining whether an operational status of said communication terminal is normal or abnormal in said communication terminal;

storing in said communication terminal a data log relating to the operational status of said communication terminal determined in said step of determining;

sending to said analyzing unit said data log via a radio telephone system when the operational status of said communication terminal is determined to be abnormal in said step of determining; and diagnosing by said analyzing unit said communication terminal based on said data log; displaying at said communication terminal the diagnostic results sent by said analyzing unit.

7. The method as claimed in claim 6, wherein said step of determining includes determining a disconnect of said communication terminal.

8. The method as claimed in claim 6, wherein said step of determining includes determining a connecting failure.

9. The method as claimed in claim 6, wherein said operational status of said communication terminal is a power supply failure.

10. The method as claimed in claim 6, wherein said operational status of said communication terminal is an abnormal transmission and/or reception of a radio wave.

11. A communication terminal for communicating with a base station comprising:

transmitting and/or receiving means for communicating with the base station;

control means for controlling a communication of said transmitting and/or receiving means and for determining whether the operational status of said communication terminal is normal or abnormal; and memory means for storing a data log relating to an operational status of said communication terminal in accordance with the determination by said control means, wherein said memory means includes means for storing said data log when said control means determines that an abnormal condition has occurred; output means for transmitting said data log stored in said memory means to another apparatus; and wherein said communication terminal further includes display means for displaying diagnostic results sent by said another apparatus.

12. The communication terminal as claimed in claim 11, wherein said output means for transmitting includes an output terminal for connecting a cable to another apparatus.

13. The communication terminal as claimed in claim 11, wherein said output means for transmitting includes data changing means for changing said data log to a radio signal to be transmitted.

14. The communication terminal according to claim 11, further comprising:

input means for receiving analyzed data processed by said another apparatus.

15. The communication terminal as claimed in claim 11, wherein said output means automatically transmits said data log stored in said memory means when a predetermined time has passed.

16. A communication terminal for communicating with a base station comprising:

transmitting and/or receiving means for communicating with the base station;

control means for controlling a communication of said transmitting and/or receiving means and for determining whether the operational status of said communication terminal is normal or abnormal;

memory means for storing a data log relating to an operational status of said communication terminal in accordance with the determination by said control means; and output means for transmitting said data log stored in said memory means to another apparatus, wherein said output means automatically transmits said data log stored in said memory means when said communication terminal does not operate in a communication network; and wherein said communication terminal further includes display means for displaying diagnostic results sent by said another apparatus.

* * * * *